United States Patent
Gallé

(10) Patent No.: US 9,740,679 B2
(45) Date of Patent: Aug. 22, 2017

(54) GENERATION OF TEXTUAL DOCUMENTS WITH REDUCED DE BRUIJN GRAPHS

(71) Applicant: Xerox Corporation, Norwalk, CT (US)

(72) Inventor: Matthias Gallé, Eybens (FR)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 14/962,506

(22) Filed: Dec. 8, 2015

(65) Prior Publication Data
US 2017/0161254 A1 Jun. 8, 2017

(51) Int. Cl.
G06F 17/27 (2006.01)
G06F 17/21 (2006.01)

(52) U.S. Cl.
CPC .......... *G06F 17/274* (2013.01); *G06F 17/21* (2013.01); *G06F 17/2785* (2013.01)

(58) Field of Classification Search
CPC ..... G06F 17/274; G06F 17/2785; G06F 17/21
See application file for complete search history.

(56) References Cited

U.S. PATENT DOCUMENTS 9,201,980 B2 * 12/2015 Tealdi ............... G06F 17/30958
2014/0222760 A1 8/2014 Trachtenberg et al.
2015/0142853 A1 5/2015 Tealdi et al.

OTHER PUBLICATIONS

Tealdi, Matias, and Matthias Gallé. "Reconstructing Textual Documents from perfect n-gram Information." Invited Talks (2013): 41.*
Parmeggiani, Alberto, and M. I. R. K. O. Degli Esposti. "Entropy and Semantics: Textual Information Extraction Through Statistical Methods." (2010).*
Kontorovich, Aryeh, and Ari Trachtenberg. "Efficiently decoding strings from their shingles." arXiv preprint arXiv:1204.3293 (2012).*
Jin, Jiaxi, Aryeh Kontorovich, and Ari Trachtenberg. "Determining the unique decodability of a string in linear time." Information Theory and Applications Workshop (ITA), 2013. IEEE, 2013.*
U.S. Appl. No. 14/714,567, filed May 18, 2015, Gallé.
Compeau, et al., "How to apply de Bruijn graphs to genome assembly," Nature Biotechnology, 29(11) pp. 987-991 (Nov. 2011).

(Continued)

Primary Examiner — Jialong He
(74) Attorney, Agent, or Firm — Fay Sharpe LLP

(57) ABSTRACT

A method for generating an output sequence includes receiving an input sequence of symbols. An output sequence is generated from a reduced directed graph derived from n-gram statistics for a corpus sequence of symbols. The graph includes nodes connected by edges that are labeled with a sequence of symbols and associated with a multiplicity representing a number of occurrences of the sequence of symbols in the corpus sequence. Each path through the graph where each edge is traversed its multiplicity of times reconstructs the corpus sequence. The sequences of symbols in the reduced graph vary in number of symbols. The output sequence from the first iteration, and optionally also an output sequence from at least one subsequent iteration, is/are output. The output sequence may be proposed to an author to assist in generating a document.

20 Claims, 6 Drawing Sheets

(56) References Cited

OTHER PUBLICATIONS

Gallé, M., et al., "Reconstructing textual documents from n-grams," Proc. of the 21st ACM SIGKDD Int'l Conf. on Knowledge Discovery and Data Mining, pp. 329-338, ACM (2015).
Miller, et al., "Assembly algorithms for next-generation sequencing data," Genomics, 95(6) pp. 315-327 (Jun. 2010).
Pevzner, et al., "An Eulerian path approach to DNA fragment assembly" Proc. National Academy of Sciences, 98(17) pp. 9748-9753 (Aug. 2001).
Pevzner, P., "1-Tuple DNA Sequencing: Computer Analysis" Journal of Biomolecular Structure and Dynamics, pp. 63-73 (1989).
Solan, Z., et al. "Unsupervised learning of natural languages," Proc. Nat'l Acad. Sci. (PNAS), vol. 102(33), pp. 11629-11634 (Jan. 2005).
Tarjan, R. "Depth-first search and linear graph algorithms," SIAM Journal on Computing, vol. 1(2) pp. 146-160 (Jun. 1972).
WolframMathWorld, "De Bruijn Graph" MathWorld, p. 1 (Oct. 2013), Retrieved from http://www.mathworld.wolfram.com/deBruijnGraph.html, on Nov. 8, 2013.

* cited by examiner

GENERATION OF TEXTUAL DOCUMENTS WITH REDUCED DE BRUIJN GRAPHS

BACKGROUND

The exemplary embodiment relates to document processing and finds particular application in connection with a system and method for automatic generation of text sequences.

Automatic text generation finds application in assisting authors to create text by proposing a next word or phrase based on the text which has already been generated and historical data. This could save the author time by reducing the amount of typing needed. However, such systems may propose words or phrases which are not what the author intends or which do not fit the author's style of writing. Thus, they may be frustrating to the author or provide limited or no reduction in the typing time.

Automatic generation of whole natural language documents has been proposed using a global, rule-based planner which decides on the general outline of the text to be produced. A purely statistical approach, based on a Markovian assumption, is to sample the next words, based on the distribution of the last n−1 produced words ($p(w|w_1 \ldots w_{n-1})$). See, for example, Zach Solan, et al., "Unsupervised learning of natural languages," Proc. Nat'l Acad. Sci. (PNAS), 102(33): 11629-11634 (2005).

Such an approach does not generally produce coherent text, except in a few rare cases, and is mostly used as parody.

The obtained text has the property that locally the phrases seem to make sense, but the overall result is nonsensical. As in other n-gram approaches, a potential solution is to enlarge the left context (n). This makes this particular property less acute, but has the drawback that the resulting text is almost an exact copy of one of the sequences in the original corpus, due to the lack of alternatives in the original corpus where substring statistics were computed.

There remains a need for a system and method for generation of textual documents given an input text sequence which provides more useful outputs.

INCORPORATION BY REFERENCE

The following references, the disclosures of which are incorporated herein in their entireties by reference, are mentioned:

U.S. Pub. No. 20150142853, published May 21, 2015, entitled RECONSTRUCTING DOCUMENTS FROM n-GRAM INFORMATION, by Matias Tealdi, et al.

U.S. application Ser. No. 14/714,567, filed May 18, 2015, entitled SYSTEM AND METHOD FOR ADDING NOISE TO n-GRAM STATISTICS by Matthias Gallé.

U.S. Pub. No. 20140222760, published Aug. 7, 2014, entitled METHOD AND SYSTEM FOR RECONCILING REMOTE DATA, by Ari Trachtenberg, et al.

BRIEF DESCRIPTION

In accordance with one aspect of the exemplary embodiment, a method for generating an output sequence includes receiving an input sequence of symbols. For a first iteration, an output sequence is generated as a candidate for appending to the input sequence. The output sequence is generated from a reduced directed graph derived from n-gram statistics for a corpus sequence of symbols. The reduced directed graph includes a set of nodes connected by edges. Each of the edges is labeled with a sequence of symbols and is associated with a multiplicity representing a number of occurrences of the sequence of symbols in the corpus sequence. Each path through the reduced directed graph in which each edge is traversed the respective multiplicity of times reconstructs the corpus sequence from the labels in the order in which the edges are traversed. The sequences of symbols in the reduced directed graph vary in number of symbols. The method further includes outputting at least one of the output sequence from the first iteration; and an output sequence from at least one subsequent iteration, wherein in the at least one subsequent iteration, the input sequence is a document sequence generated by appending the output sequence of each prior iteration to the received input sequence.

One or more of the steps of the method may be performed with a processor.

In accordance with another aspect of the exemplary embodiment, a system for generating an output sequence includes memory which stores a reduced directed graph generated from n-gram statistics for a corpus sequence of symbols. The reduced directed graph includes a set of nodes connected by edges. Each of the edges is labeled with a sequence of symbols and is associated with a multiplicity representing a number of occurrences of the sequence of symbols in the corpus sequence. Each path through the reduced directed graph in which each edge is traversed the respective multiplicity of times reconstructs the corpus sequence from the labels in the order in which the edges are traversed. The sequences of symbols in the reduced directed graph vary in number of symbols. A text generation component receives an input sequence of symbols and, in a first iteration, generates an output sequence as a candidate for appending to the input sequence of symbols. The output sequence is generated from a label of the reduced directed graph. The label includes a prefix, which matches at least the last symbol of the input sequence of symbols, and a suffix, following the prefix, which includes at least one symbol. An output component outputs at least one of: the output sequence from the first iteration; and an output sequence from at least one subsequent iteration. In the at least one subsequent iteration, the input sequence is a document sequence generated by appending an output sequence of each prior iteration to the received input sequence. A processor implements the text generation component and the output component.

In accordance with another aspect of the exemplary embodiment, a method for generating a text generation system includes receiving n-gram statistics for a set of n-grams, generated for a corpus of documents. A directed input directed graph is generated, based on the n-gram statistics. Edges of the input directed graph are joined through nodes of the graph. Each edge of the input directed graph has an associated label and a multiplicity of at least one. Each of the n-grams in the set is represented by a respective one of the labels, whereby a Eulerian cycle through the graph traverses each edge the respective multiplicity of times. The method includes iteratively applying at least one reduction rule to generate a reduced directed graph. Edges of the reduced directed graph are joined through nodes of the reduced directed graph. Each edge has an associated label consisting of a sequence of symbols and a multiplicity of at least one. Each path through the reduced directed graph in which each edge is traversed the respective multiplicity of times reconstructs the corpus sequence from the labels in the order in which the edges are traversed. The sequences of symbols in the reduced directed graph vary in number of symbols. A text generation component is provided, which receives an input sequence of symbols and, in a first iteration, generates an output sequence as a candidate for appending to the input sequence of symbols, the output sequence being generated from a label of the reduced directed graph which includes a prefix which matches at least the last symbol of the input sequence of symbols and a suffix, following the prefix, which includes at least one symbol.

At least one of the iteratively applying of the reduction rule(s) and providing the text generation component may be performed with a processor.

DETAILED DESCRIPTION

Aspects of the exemplary embodiment relate to a system and method for generation of text by extending an input text sequence.

The system and method make use of variable-length n-grams, which enables some larger chunks of text to be produced, while others are relatively short. The shorter chunks of text may serve as crossroads, from where several different alternatives are possible. Instead of using some heuristics based on the distribution of $p(w|w_1 \ldots w_{n-1})$, as in Solan, the exemplary method makes use of chunks corresponding to edges in de-Bruijn graphs, which are generated from a text corpus. See, for example, above-mentioned U.S. Pub. No. 20150142853, U.S. application Ser. No. 14/714,567, and Matthias Gallé, et al., "Reconstructing textual documents from n-grams," Proc. of the 21st ACM SIGKDD Int'l Conf. on Knowledge Discovery and Data Mining, pp. 329-338, ACM (2015). These variable-length chunks (i.e., sequences with different numbers of words) have the property that they have to occur in any document reconstruction that uses exactly all the n-grams of an input directed graph generated from the text corpus, and are well-suited to be basic building blocks to construct new documents.

This has the additional advantage that sampling from the output graph has a natural implementation in the form of a random (or guided) walk over this graph.

Figure 1:
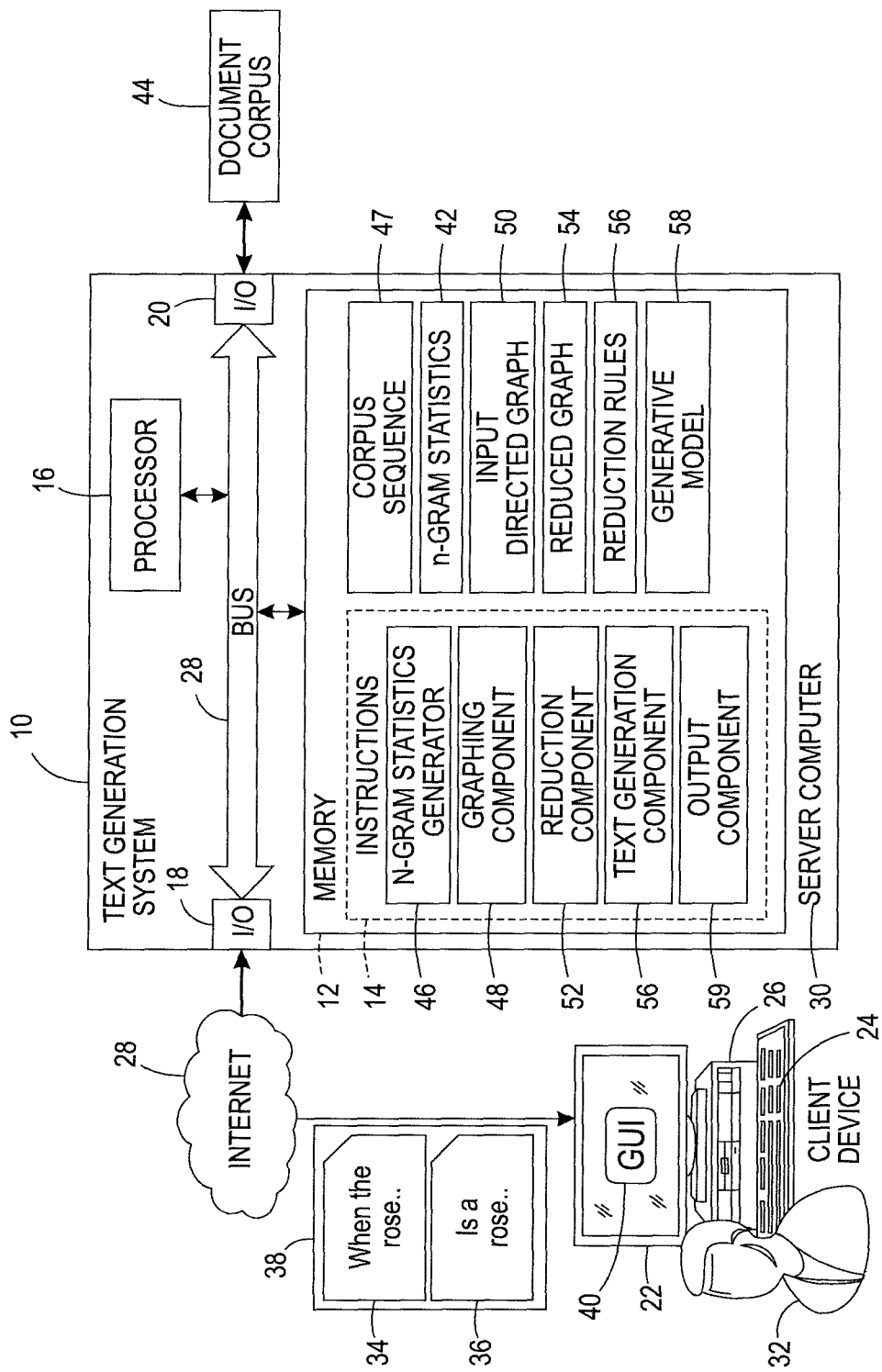
FIG. 1 illustrates a system for reconstructing documents in accordance with one exemplary embodiment.
Figure 2:
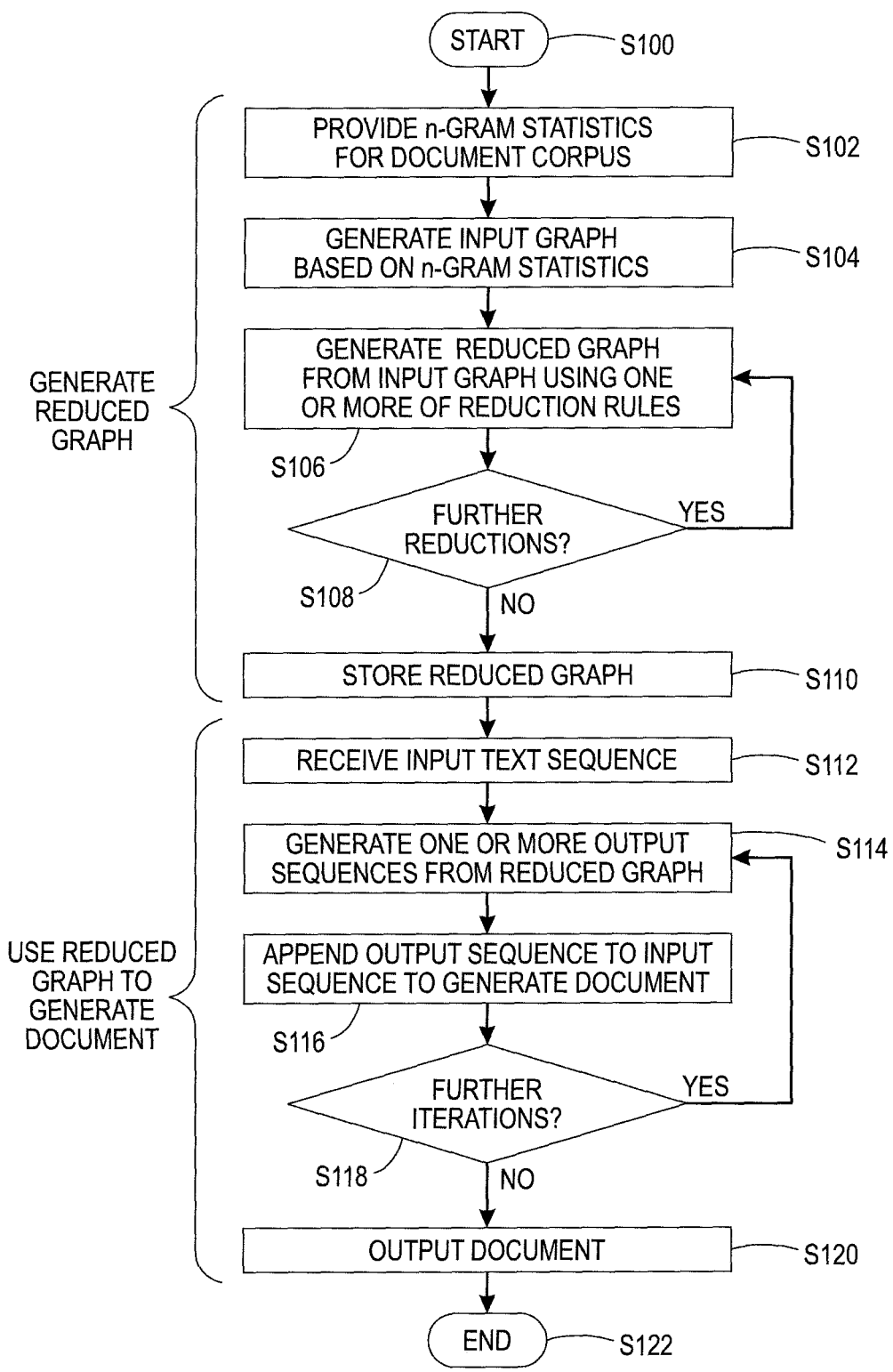
FIG. 2 illustrates a method for reconstructing documents in accordance with another exemplary embodiment.

With reference to FIG. 1, a computer-implemented system 10 for generation of text documents includes memory 12, which stores software instructions 14 for performing the method illustrated in FIG. 2, and a processor 16 in communication with the memory for executing the instructions. The system 10 also includes one or more input/output (I/O) devices, such as a user input output interface 18 and a network interface 20. The I/O interface 20 may communicate with one or more of a display 22, for displaying information to users, speakers, and a user input device 24, such as a keyboard or touch or writable screen, and/or a cursor control device, such as mouse, trackball, or the like, for inputting text and for communicating user input information and command selections to the processor device 16. The display 22 and user input device 24 may be directly connected to the system or may be part of a separate client device 26, which is linked to the system by a wired or wireless connection, such as a local Area Network, Wide Area Network, or the Internet. The various hardware components 12, 16, 18, 20 of the system 10 may all be connected by a data/control bus 28.

The computer system 10 may include one or more computing devices 30, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data.

The input/output (I/O) interface 18, 20 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 30.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

A user 32 of the system 10 generates a sequence 34 of one or more words, e.g., in the process of authoring a document on the client device 26. The sequence 34 is input to the system 10. The system 10 extends the input sequence with an output sequence 36, the input sequence and output sequence together forming a document 38, which may be displayed to the user via a graphical user interface (GUI) 40 on the display device 22, or otherwise output in a human-understandable form.

The exemplary system 10 has access has to n-gram statistics 42. The statistics are 42 generated from a document corpus 44, which includes a collection of text sequences, e.g., in the form of one or more documents. For example, the collection 44 may comprise a set of documents previously authored by the user. In one embodiment, the instructions 14 include an n-gram statistics generator 46, which converts a text document or set of documents 44 into a single corpus sequence 47 of words and, from the corpus sequence, generates the n-gram statistics. In another embodiment, the n-gram statistics 42 are precomputed elsewhere, and provided to the system, which is advantageous if the user wishes to maintain a degree of confidentiality regarding the document(s) in the corpus 44.

While the corpus sequence 47 is described herein as a sequence of words, and the n-grams as being fixed length word sequences derived from the corpus sequence, the corpus sequence may more generally be described as a sequence of symbols, which can be words, characters, symbols occurring in a biological sequence (such as a sequence composed of amino acids or a DNA or RNA sequence), or the like, which are drawn from a respective alphabet of symbols.

The instructions 14 may include a graphing component 48, which generates an input directed graph 50, such as a de Bruijn graph, from the statistics 42, a reduction component 52, which generates a reduced directed graph 54 from the input directed graph 50 using a set of reduction rules, a text generation component 56, which generates at least one output sequence 36, given the input sequence 34 and the reduced directed graph 54, which may be performed with a generative model 58, and an output component 59, which outputs the output sequence 36 or a document 38 generated therefrom, e.g., for displaying to the user on the display device 22.

The exemplary components 46, 48, 52, 56, 59 may separate or combined and may be in the form of software implemented by hardware or hardware components.

The statistics generator 46, if present, generates n-gram statistics from the document corpus, e.g., as described in U.S. Pub. No. 20150142853. Each n-gram in the statistics is a sequence of length n symbols, which in the exemplary embodiment are words, and where n is at least 2. For example, n may be 2, 3, 4, 5, 10, or more, and in some embodiments, up to 20. In the case of words, for example, each word can be considered as a symbol drawn from an alphabet of symbols and each n-gram in the set is exactly n words (symbols) in length. In the statistics, each n-gram is associated with a number of its occurrences in the corpus 44.

In the exemplary embodiment, all n-grams in the document or corpus 44 are extracted so that the n-gram statistics are complete, i.e., they include every possible n-gram of the selected number of symbols n and the exact number of occurrences. In other embodiments, substantially all n-grams are extracted, such as at least 90%, or at least 95%, or at least 98% of the n-grams and/or n-gram occurrences are extracted. For example, the user may wish some of the n-grams to remain confidential and thus not provide statistics on them. The words (unigrams) can be automatically identified in a text document based on the white spaces between them. The extraction of n-gram statistics may include generating a document-length sequence, which may include adding unique beginning and ending symbols which do not appear as symbols (words) in the document corpus (here illustrated by "$" and "#"). For example, given a very small document which consists solely of A rose is a rose is a rose rose, based on Gertrude Stein's poem, the document-length sequence generated is $ A rose is a rose rose is a rose #. Then, starting at a first end, all possible n-grams are extracted, i.e., including overlapping n-grams. For example, if n is 2, the n-gram statistics would be as shown in TABLE 1:

TABLE 1

| n-gram | Number of occurrences |
| --- | --- |
| $ a | 1 |
| a rose | 3 |
| rose is | 2 |
| is a | 2 |
| rose rose | 1 |
| rose # | 1 |

As will be appreciated, the n-grams may be listed in any order, such as alphabetical order, number of occurrences, or randomly. While the list is illustrated as a table, any suitable data structure may be employed for storing the n-gram statistics 42.

In the case of two or more documents, their sequences may be concatenated. Punctuation, capitalization, and/or numbers may be ignored in some embodiments. Other preprocessing may also be performed prior to generation of the input directed graph 50.

Figure 3:
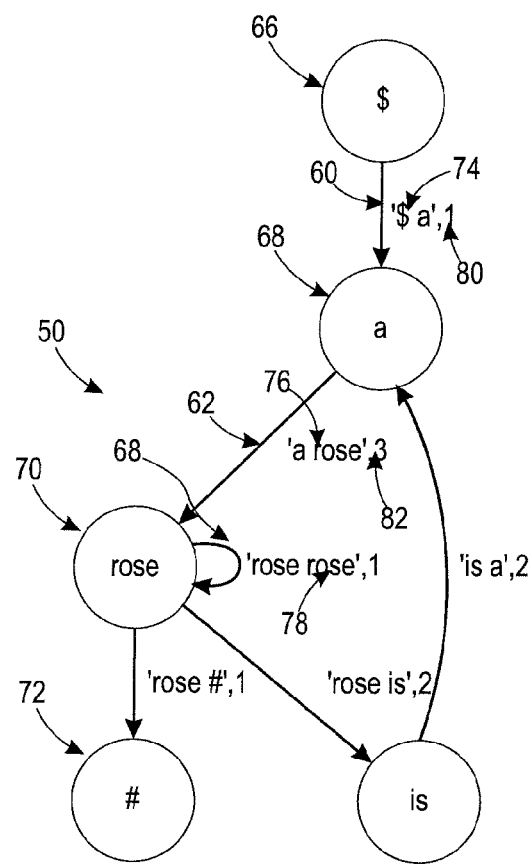
FIG. 3 illustrates an original de Bruijn graph for an example of the reduction on the sequence "$ a rose rose is a rose #"

The exemplary graphing component 48 generates an input directed (e.g., de Bruijn) graph 50 from the n-gram statistics 42. An exemplary graph for the sentence above is illustrated in FIG. 3, where directed edges (illustrated by arrows) 60, 62, 64, etc., of the graph are joined through nodes 66, 68, 70, 72, etc. of the graph, each edge having an associated label 74, 76, 78, etc., and a multiplicity 80, 82, etc., of at least one. Each of the n-grams in the set is represented by a respective one of the labels. Each label is thus a sequence of n words, or more generally, a sequence of exactly n symbols. The internal nodes 68, 70, etc., represent n−1 grams. For example, the node 70 at the head of the arrow 62 represents the suffix of the n-gram 76, while the node 68 at the tail of the arrow represents the n-gram's prefix. Terminal nodes 66, 68 represent the unique symbols $, # added at the beginning and end. The multiplicity 80, 82 represents the number of occurrences of the respective n-gram stored in the n-gram statistics. The input directed graph 50 is considered a de Bruijn graph when an Eulerian cycle through the graph traverses each edge the respective multiplicity of times.

A graph is Eulerian if it is connected and the indegree of each internal node equals the outdegree, where indegree is the sum of the incoming edges multiplied by their multiplicities and outdegree is the sum of the outgoing edges multiplied by their multiplicities. For example, in FIG. 3, node 70, has two incoming edges 62, 68 and three outgoing edges. The indegree is 3+1=4 and the outdegree is 1+2+1=4, therefore indegree=outdegree=degree of the node.

Methods for generating de Bruijn graphs are described, for example, in U.S. Pub. No. U.S. Pub. No. 20150142853 and in Eric W. Weisstein, "de Bruijn Graph," in MathWorld—A Wolfram Web Resource (October 2013), and Compeau, et al., "How to apply de Bruijn graphs to genome assembly," Nature Biotechnology, 29(11) pp. 987-91 (2011).

Figure 4:
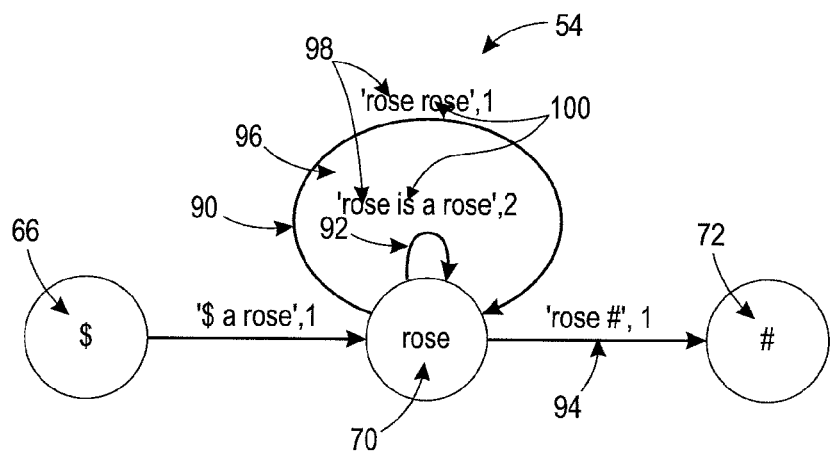
FIG. 4 shows the graph of FIG. 1 reduced to its most irreducible form.

The reduction component 52 generates a reduced (de Bruijn) graph 54 from the input directed graph 50. An exemplary reduced directed graph 54 generated from the input directed graph 50 of FIG. 3, is illustrated in FIG. 4. As for the input directed graph, nodes 66, 70, 72 of the reduced directed graph are connected by edges 90, 92, 94, etc. each associated with a respective label and a multiplicity. However, as can be seen in FIG. 4, in the reduced directed graph, the labels of the edges are no longer all n-grams of the same length as in FIG. 3, with some being longer. For example, label 96 of edge 92 is a 4-gram. The new edge 96 is derived from at least two of the edges in the input directed graph (in this case, three edges), following the direction of the arrows.

Figure 5:
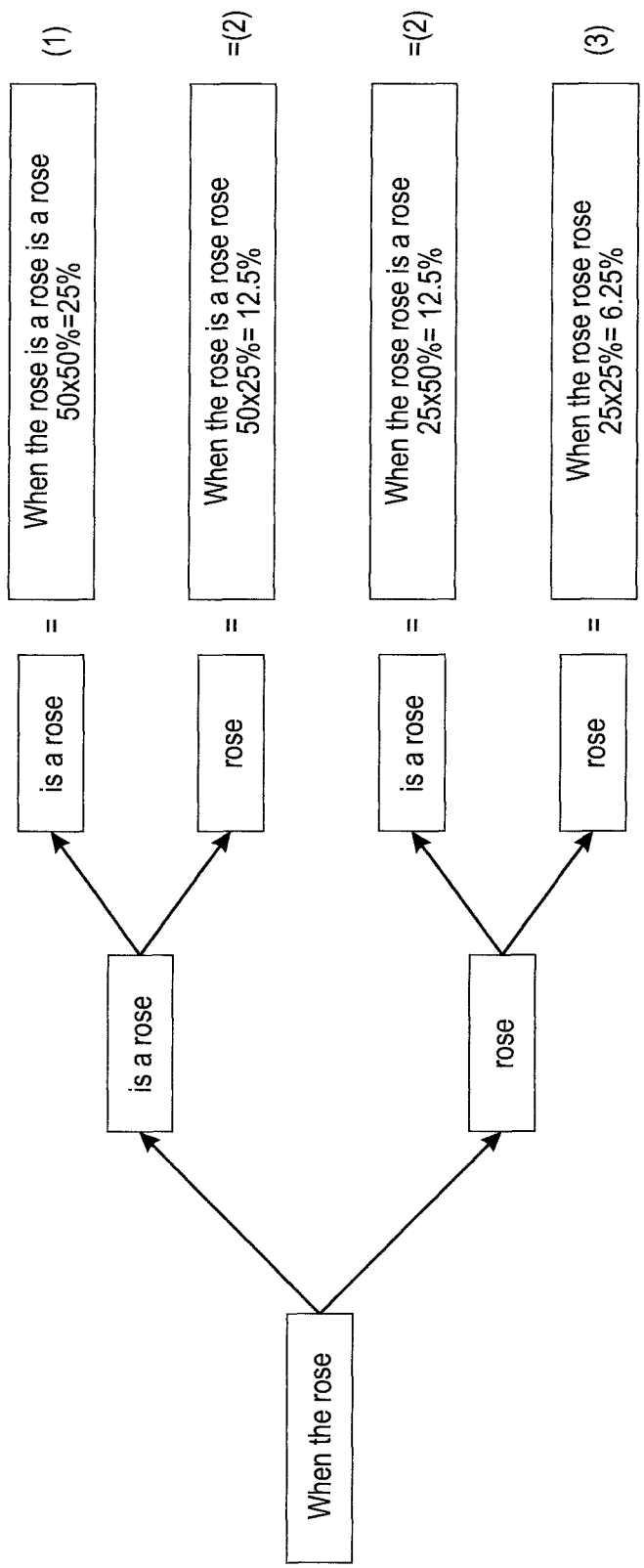
FIG. 5 illustrates generation of output sequences in three iterations.

An input de Bruijn graph 50 as illustrated in FIG. 3 represents all given n-grams as edges between nodes that have a one-to-one relationship to n−1-grams. Any Eulerian path over the input graph 50 could give rise to the document that could be behind the original n-gram statistics. A purely Markovian model of text generation based on n-grams is formally equivalent to a random path on the input de-Bruijn graph 50. Two consecutive edges ($e_1$=(u, v), $e_2$=(v, w)) overlap by n−1 words: the tail of the n−1-gram $e_1$ is equal to the head of $e_2$. A random walk therefore corresponds to creating sequence through a simple language model of size n−1. However, by reducing the graph to a reduced de Bruijn graph 54, such as the one shown in FIG. 4, sequences of variable length are created which can lead to more plausible documents. FIG. 5 illustrates such a random walk.

The exemplary reduction 52 component generates the reduced directed graph 54 by iteratively applying the reduction rules 56. The reduction rules may be as described in U.S. Pub. No. 20150142853. These rules result in merging of successive edges only if these edges are adjacent in all possible Eulerian paths through the input directed graph (or a graph generated therefrom in a prior iteration). This results in a reduced directed graph 54 that is equivalent to the input graph, in the sense that it generates the same documents as the original graph. If the reductions are performed until no further edges can be merged, the resulting reduced directed graph 54 is irreducible in that no other two edges will be adjacent in all Eulerian paths. As will be appreciated, is not necessary in the present case for the reduction rules to be applied until an irreducible graph is formed, although this is done in the illustrative examples below.

Figure 6:
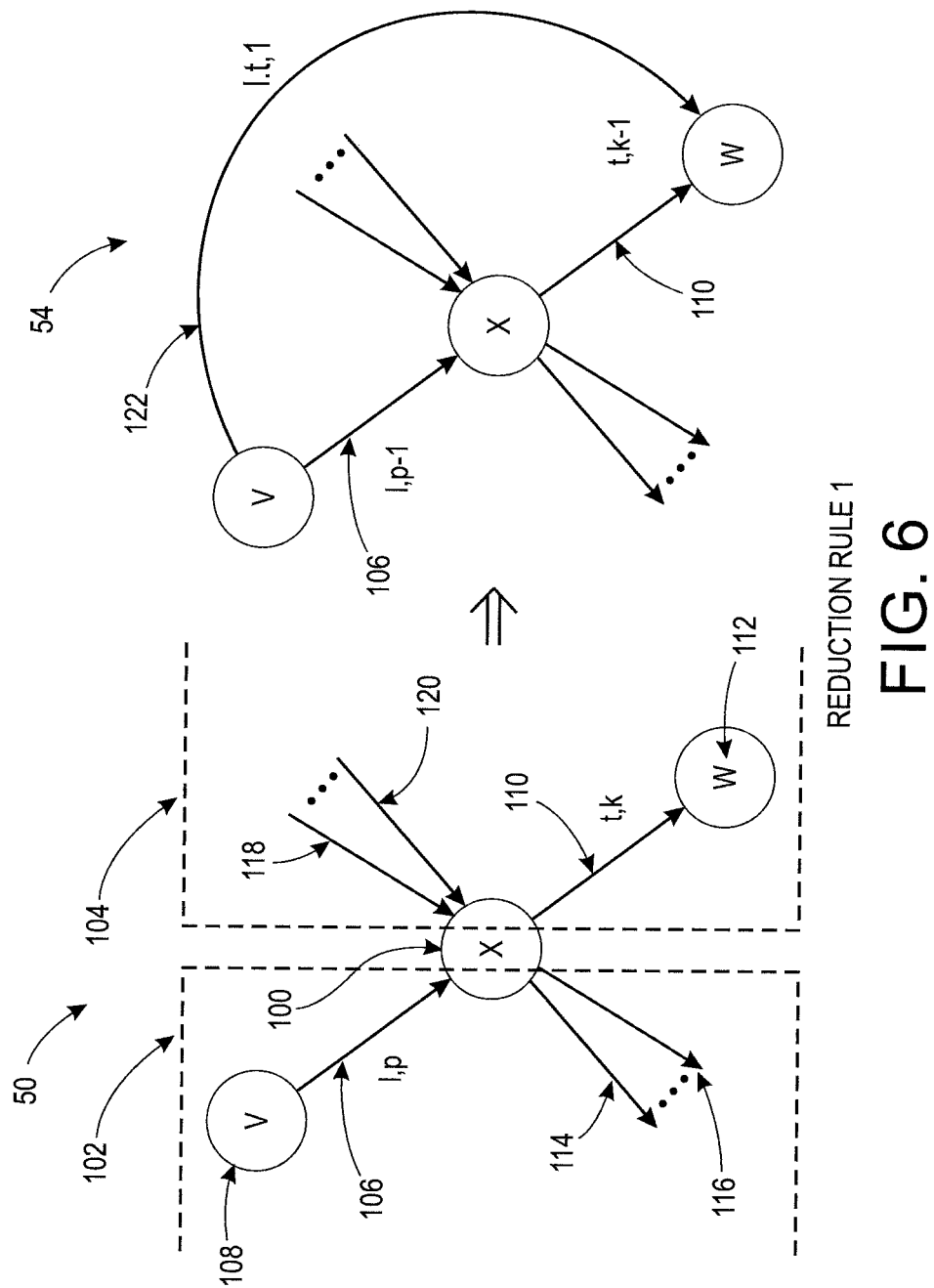
FIG. 6 illustrates application of Rule 1 on an exemplary directed graph.

The exemplary reduction rules 56 include first and second reduction rules. As illustrated in FIG. 6, the first a reduction rule is configured for identifying a division point node 100 of the input directed graph 50, or of a reduced directed graph 54 generated therefrom. This divides the respective graph into at least two connected components 102, 104, such that there is a unique incoming edge 106 from one of the nodes 108 to the division point node in the first connected component 102 and a unique outgoing edge 110, from the division point node 100 to another of the nodes 112, in the second connected component 104. Other incoming and outgoing edges to the division point 100 are illustrated by arrows 114, 116, 118, 120, which may be connected to other nodes of the graph (not shown). The first reduction rule is configured for generating a new edge 122, with a label which is derived from the labels of the unique incoming edge 106 and the unique outgoing edge 110. As illustrated, labels l and t of the input directed graph are concatenated to generate a new label l.t with an associated multiplicity, that is no greater than the maximum of the multiplicities p and k of the edges 106, 110 of the input directed graph. In the case, the multiplicity is 1. The multiplicity of the edges 106, 110 is reduced by the multiplicity of the new edge 122. In some cases, one or both of edges 106, 110 may disappear from the reduced directed graph 54 as a result.

Figure 7:
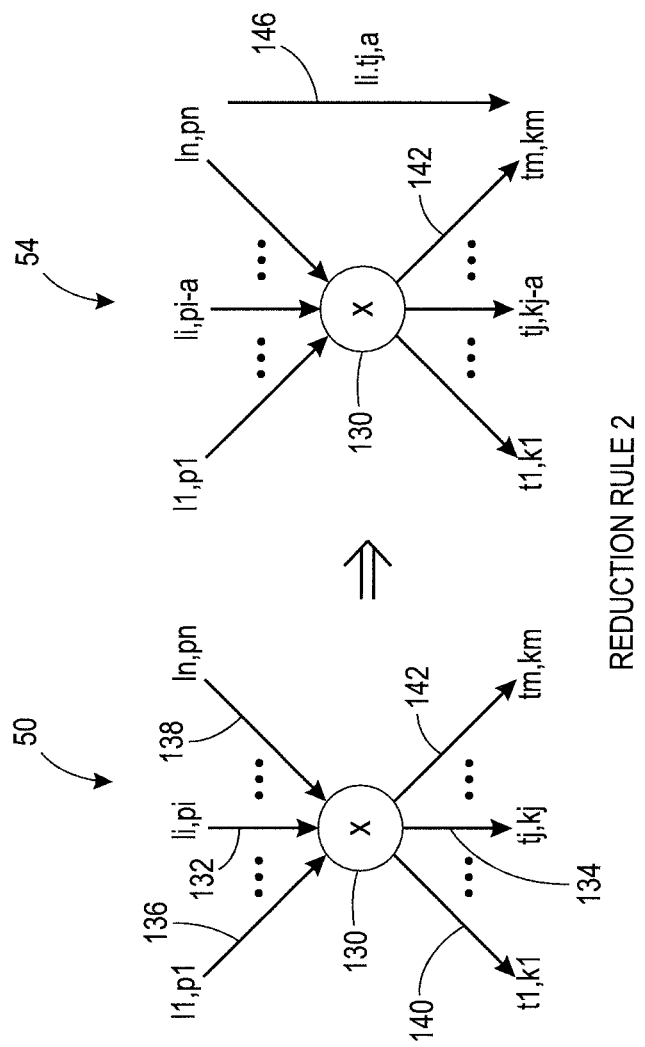
FIG. 7 illustrates application of Rule 2 on an exemplary directed graph.

As illustrated in FIG. 7, the second reduction rule is configured for identifying a first node 130 of the input directed graph 50, or of a reduced directed graph 54 generated therefrom, which includes a first incoming edge 132 from a second node (not shown) and a first outgoing edge 134 to a third node (not shown) for which the multiplicity of one of the first incoming edge and the first outgoing edge is greater than a degree of the first node minus the multiplicity of the other of the first incoming edge and the first outgoing edge. The degree of the first node 130 is computed as a sum of incoming edges 132, 136, 138 (or outgoing edges 134, 140, 142) of the node multiplied by their multiplicities $p_1$, $p_i$, $p_n$ (resp. $k_1$, $k_j$, $k_m$). The second reduction rule is configured for merging the first incoming edge 132 and the first outgoing edge 134 to create a new edge 146 in the reduced directed graph 54 with a label $l_i.t_j$ which is derived from the first incoming edge and the first outgoing edge, by concatenating the respective labels.

When the reduction rules have been applied, e.g., until no further iteration of either of the rules is possible, the reduced directed graph 54 is equivalent to the input directed graph 50, in that each graph is traversable by at least one Eulerian cycle, each of the at least one Eulerian cycles corresponding to a candidate corpus sequence of words from which the n-gram statistics could have been generated (one of the candidate corpus sequences corresponding to the actual corpus sequence 47). Each of the candidate corpus sequences for the reduced directed graph 54 also corresponds to a respective candidate corpus sequence for the input directed graph.

The reduced directed graph 54 may be created off-line and stored in memory 12 until needed.

The text generation component 56 uses the reduced directed graph 54 to extend an input text sequence 34 in one or more iterations. This includes sampling or selecting from those of the edges of the reduced directed graph which include at least the last (n−1) words of the input sequence of words and at least one subsequent word n (or terminating symbol) which is not in the input sequence. The sampling may be as a function of the multiplicities of these edges.

In an exemplary embodiment, the output sequence is generated with a generative model 58 which is Markovian and generates a sequence iteratively. States represent n−1 grams, and the distribution of possible continuation of the text is given by the probability of sampling a label which includes ω, given the n−1 words of the current state of the input sequence, denoted $p(\omega|w_1 \ldots w_{n-1})$, where $w_1 \ldots w_{n-1}$ denotes the current state and ω represents a sequence of one or more words including $w_1 \ldots w_n$. The possible ω are taken from a set W which are not necessarily all of the same length, although there are all of length at least n. The next state is then given by the suffix that immediately follows the n−1 word(s) of ω. This is a more generalized version of "language-model." In the language model case, however, all ω are of a fixed size n and the text is then generated word by word. In the present case, ω are a variable size (variable number of words) of at least size n, but in many cases are longer than n. For example, for some edges the label includes at least n+1 symbols (words) and in some cases, at least n+2 symbols (words), so the suffix can vary in number of symbols (words).

The probability of selecting a given label can be derived from the multiplicities of the labels in the set W. For example, the multiplicities of all outgoing edges are summed and each edge is then expressed as a percentage of the total. In another embodiment, the sampling includes a weighting function which gives a higher weight to labels that include a greater number of symbols than those which include fewer. The weighting function may be combined with the probabilities based on the multiplicities to generate a length-weighted probability. In one embodiment, when an edge has been selected in one iteration its multiplicity may be reduced (by one) for each subsequent iteration.

The selection of W affects the capability of the model 58 to generate plausible output sequences. If it only contains short strings, then, without any other way of storing past information, the resulting text will become incoherent. If it only contains long strings, then the resulting text will result very similar to one of the original documents from which substring statistics were obtained. By identifying the set W from the labels of the reduced directed graph 54 which include a suffix of words that are preceded by $w_1 \ldots w_{n-1}$, the length of the added words is variable. The sampling of the set W can be done either in a random fashion, or in a supervised way. This provides a useful authoring tool.

For example, in the illustrative case, the input sequence is When the rose. Suppose n is 2. The reduced directed graph of FIG. 4 includes edges 90, 92 which include, as a prefix 98 of the respective label 96, the last n−1 words of the input sequence, i.e., the word rose, and which also include a suffix 100, which includes at least one subsequent word n, which can be used to generate the output sequence. The prefix 98 is thus the first n−1 words of the label and the suffix 100 is all subsequent words of the label. Since rose is a rose has a greater multiplicity than rose rose, it may be sampled more often, e.g., twice as often in this case since its multiplicity is twice that of rose rose. There is also edge 94, which if sampled, results in termination of the output sequence without addition of any more words. The text generation component 56 may perform one or more additional iterations in the process of generating the output sequence 36, using, for each subsequent iteration, the last n−1 words of the previously-generated output sequence for the sampling. The output sequence is a concatenation of the words added at each iteration. For example, in the illustrative case, suppose rose is a rose was selected in the first iteration. Then, in a second iteration, the selection of one of the two edges 90, 92 including the n−1 word(s) (rose) of the sequence generated in the prior iteration as a prefix 96, could result in an output sequence of any one of is a rose is a rose (50% probability); is a rose rose (25% probability); and is a rose. (25% probability, if the edge including the terminator symbol # is sampled). In some cases, the edges which include the terminator symbol may be ignored. The method may proceed through several iterations, each appending a new suffix to the already generated sequence, as illustrated in FIG. 5. When the system generates more than one candidate sequence, such as the four shown in FIG. 5, they may be ranked in accordance with their overall probabilities, i.e., the product of the probabilities of selecting each suffix added. The top-ranked output sequences may be proposed to the user.

As will be appreciated, in the illustrative example, if n were to be 3, then the reduced directed graph 54 illustrated in FIG. 3 would not include any sequences W including the rose as the prefix 96 and thus may not make any proposals. In another embodiment, in such a case, the system could artificially reduce the size of n for this iteration, until there is at least one sequence in the set W, although this could generate output sequences which are less likely to be plausible.

In some embodiments, the GUI 40 may be caused to display two or more of the output sequences 36 generated in one or more iterations, e.g., as a list in which the most probable output sequence is displayed first, and so on. The user 32 is able to accept the most probable one of the output sequences, select a different one, or select none of them, if none of the output sequences is suitable.

In experiments described below, the exemplary method produces more plausible sentences, while at the same time creating a solid basis for the interactive generation of new documents.

The enlarged blocks 96, etc. of the reduced directed graph 54 have good properties to be used as atomic units in the generation of new documents. These are the substrings for which the data contains enough evidence that they had to occur in the original corpus. In some cases, this is because the path through them is a chain: if a node only has one incoming and one outgoing edge than they obviously belong together. Other cases however indicate not a lack of data, but just that these particular phrases where overwhelmingly used together, even in the presence of other possible alternatives. It has been found that diversity affects the length of these blocks negatively. This is, when more and more documents are considered in the corpus 44, the average length of these maximal blocks decreases. The reason for this is in the way these blocks are assembled: two consecutive edges are merged only if the surrounding evidence (incoming and outgoing edges of the node in the middle) supports the fact that the merged edge had to occur. These other nodes are based on alternative context in which the considered substrings occurred in in the original set of documents. A substring which occurs in several different contexts has therefore lower chances of being extended than another one that predominantly occurs in a few ones. Therefore, for a substantially-sized corpus, a merge between two n-grams indicates that they occur enough times sequentially to offset any occurrence where they occur with other contexts. They therefore tend to represent idioms, characteristic sentences and/or semantically coherent chunks of text. In some embodiments, when the corpus 44 is so large that very few enlarged chunks are generated, the corpus may be split into sub-corpora and used to generate two or more reduced directed graphs 54 which may each be sampled.

FIG. 2 illustrates a method for text generation which may be performed with the system of FIG. 1. The method may proceed in two stages, a first (e.g., offline) stage in which a reduced directed graph is generated, based on n-gram statistics for a document corpus, and a second (online) stage in which an input sequence is extended to form a document, based on labels of the reduced directed graph, in one or more iterations. The method begins at S100.

At S102, n-gram statistics 42 are provided. In some embodiments, the statistics may be generated by the statistics generator 46 from a document corpus 44. In other embodiments, there is no access provided to the original document(s) and the statistics 42 are received from an external source that has access to the original document(s) 44 from which the n-gram statistics are generated.

At S104, a directed input (de Bruijn) graph 50 is generated, by the graphing component 48, based on the statistics 42.

At S106, one more reduction rules is applied to the input directed graph 50 to generate a reduced directed graph 54, e.g. in a plurality of iterations. If at S108, no further changes can be made with the rules, or other predetermined stopping point is reached, the method proceeds to S110, otherwise, the method returns to S106, where one or more of the reduction rules is applied to the reduced directed graph to generate a (further) reduced directed graph and so forth, e.g., until the reduced directed graph is no longer reducible by either of the reduction rules.

At S110, the reduced directed graph is stored. This ends the first stage. Once the reduced directed graph has been stored, it need not be generated again. Alternatively, it may be regenerated for the user based on a new or modified corpus of documents. In one embodiment, the first stage may be repeated for each of a plurality of different users 32/document corpora 44, allowing an appropriate one of a set of reduced directed graphs 54 to be retrieved when an input text sequence is received.

At S112, an input text sequence 34 is received, e.g., from a user 32 for whom the reduced directed graph 54 has been created, based on the user's previously authored document(s) 44.

At S114, in a first iteration, at least a first output sequence 36 is generated, based on the input sequence 34, by the text generation component 56, e.g., by using the generative model 58. This may include predicting at least one output sequence corresponding to a suffix 100 of a label of the reduced directed graph which has as its prefix 98, the last n−1 words of the input sequence 34 as a function of the multiplicity of the corresponding edge.

At S116, the output sequence 36 may be appended to the input sequence to generate a document.

If at S118, further iterations are to be performed (which may be defined, for example by a fixed number of iterations, a maximum number of appended words, or until no further output sequences can be appended, or based on a combination of such stopping criteria), the method returns to S114, where the input sequence is the document generated at S116 in the prior iteration. Otherwise, the method proceeds to S120, where the document 38 is output. This may including proposing one or more candidate sequences (generated in at least one of the iterations) to the user 34 in a graphical user interface 40 for appending to the input sequence 34. Each of the candidate sequences is a different sequence of symbols derived from different output sequences, or concatenations of different output sequences, from the one or more iterations. If the user selects one of the sequences, it is automatically appended to the input sequence. The user may choose to modify the appended text, at any time. In another embodiment, the most probable output sequence 36 may be automatically appended to the user's text, with the user having to positively reject it if it is unsuitable.

The method may subsequently return to S112, where the input text sequence includes the last words appended and/or typed by the user up to that time.

The method ends at S122.

As will be appreciated, the system and method have been described in the context of assisting a user to author a document based on the prior documents 44 authored by the same user. However, the system and method are not limited to this type of authoring.

For example, in another embodiment, the corpus 44 may include documents of a different user. For example, the user 32 may wish to author documents in the style of novelist William Faulkner, in which case, the document corpus may be composed of William Faulkner's novels.

In another embodiment, the system and method may be used for automated text generation, for example, to predict how a given author could have completed a sentence.

In one embodiment, the output text 36 may be subjected to further processing, rather than being output to the client device 26. For example, the output document may be sent to a machine translation system (not shown) to translate the text to another language, which may be sent to the client device 26 for outputting on the display device 22.

In one embodiment, the document 38 may be subjected to a grammatical check, e.g., before the output text is proposed to the user. If the output text does not fit grammatically with the input text it may be modified (e.g., by making verb tense, gender, or singular/plural nouns conform to those used in the input text In another embodiment, documents found to be non-grammatical may simply be rejected or the output sequences ranked lower than other output sequences, when two or more candidate sequences 36 are displayed.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30, (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive of independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method for text generation. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details of the reduction steps will now be described.

Reduction Steps

Given a de Bruijn graph G, with nodes V and edges E, the goal is to find an equivalent, reduced directed graph G* such that the Eulerian cycles (as defined by their labels) of both graphs are equal and such that G* cannot be reduced further. To achieve this, a series of reduction steps is performed which preserve Eulerian cycles (correctness), and which are complete in the sense that their successive application ensures an irreducible Eulerian graph.

For this, a further definition is employed, that of division point (see, FIG. 6):

Definition 1: A node x is a division point of an Eulerian graph G, if there exists nodes v, w (not necessarily different) for which all non-empty paths from v to w, and from w to v go through x. (i.e., for all possible Eulerian paths).

This is similar to the concept of articulation points but it also includes self-loops (because v may be equal to w). See Robert Tarjan, "Depth-First Search and Linear Graph Algorithms," SIAM Journal on Computing, 1(2):146-160, June 1972, for a discussion of articulation points.

Removing any division point splits the graph into two or more connected components that are themselves Eulerian graphs. This may be defined formally as:

Definition 2: If x is a division point of an Eulerian graph G=(V,E) then it generates graphs $G_i$, where there is one $G_i$ for each:

a) self-loop e={⟨x,x,l⟩,k}. In this case $G_i$={{x},{e}} b) connected component that remains by eliminating x. In this case, $V_i$ will be the nodes of this component, plus x.

$$E_i = \{e : head(e), tail(e) \in V_i, e \text{ is not a self-loop over } x\}$$

Each connected component $G_i$ contains an Eulerian circuit. For the self-loops, this is readily seen. For the other cases, they are connected by definition, and the degrees of nodes different than x are not modified, so they are balanced. The copy of x in each graph remains balanced. This is true because G had an Eulerian circuit, and the only way of crossing components is through x. Each circuit that leaves x to pass into a first connected component $G_i$ has to return to x (from the same component because x is division point) before visiting another component. This observation that each Eulerian circuit inside a component is independent of what occurs in other components facilitates the reduction steps.

Because all Eulerian circuits have to cross x, the division points are a natural point to try to reduce the graph. However, the numbers of different incoming and outgoing edges from the same component are also taken into account by the first reduction rule (Reduction Rule 1). The second reduction rule (Reduction Rule 2) then merges edges within one of the components (if two or more components have been generated. In the exemplary embodiment, the system makes an attempt to apply Rule 1 first, before moving on to Rule 2. The method may then return to Rule 1, or to repeat Rule 2.

Reduction Rule 1:

Let G=(V,E) be an Eulerian graph and x∈V a division point that divides G into exactly two connected components $G_1, G_2$. If $$\hat{d}_{in_{G_1}}(x) = 1 \text{ and } \hat{d}_{out_{G_2}}(x) = 1$$

(these unique edges are denoted as (⟨v,x,l⟩,p) and (⟨x,w,t⟩,k), respectively), a reduced directed graph G'=(V', E') can be defined such that:

$$E'=(E\setminus\{(\langle v,x,l\rangle,1),(\langle x,w,t\rangle,1)\})\cup\{(\langle v,w,l.t\rangle,1)\},$$

i.e., the edges of the reduced directed graph are the edges of the input directed graph, except for that the multiplicity of the unique edges is reduced by one and that there is a new edge whose label is the union of those of the two unique edges and which has a multiplicity of 1, and where: V'=V (i.e., the nodes are the same).

This rule is illustrated in FIG. 6. Note that this rule does not eliminate nodes, but there is at least one additional edge 122, which bypasses node x.

Rule 1 may, in some cases, be applied to more than one node, where the second and subsequent times, it is applied on a component of the graph.

As will be appreciated, there may be cases where Rule 1 cannot be applied to the input directed graph, and the method then proceeds to Rule 2.

Reduction Rule 2:

Let G=(V,E) be an Eulerian graph, with a node x∈V with one or more incoming edges (⟨$v_1$,x,$l_1$⟩,$p_1$), . . . , (⟨$v_n$,x,$l_n$⟩,$p_n$) and one or more outgoing edges (⟨x,$w_1$,$t_1$⟩, $k_1$) . . . (⟨x,$w_m$,$t_m$⟩,$k_m$).

Then, where there exists a 1≤i≤n (first incoming edge) and a 1≤j≤m (first outgoing edge) such that either of the following is true (both are equivalent statements):

a) $p_i$>d(x)−$k_j$ (i.e., the multiplicity $p_i$ of the first incoming edge is greater than the degree d (x) (i.e., indegree or outdegree) of the node minus the multiplicity of the first outgoing edge)

b) $k_j$>d(x)−$p_i$ (i.e., the multiplicity $k_j$ of the first outgoing edge is greater than the degree d(x) of node x (i.e., indegree or outdegree) of the node minus the multiplicity of the first incoming edge (as noted above, the indegree and outdegree are the same).

Then a reduced directed graph G'=(V',E') is defined, such that:

$$E'=E\setminus(\{\langle v_i,x,l_i\rangle,a),\langle(x,w_j,t_j\rangle,a)\})\cup\{\langle v_i,w_j,l_i t_j\rangle,a)\}$$

where: a is the multiplicity of the new edge created from the union of the first incoming and outgoing edges, with a multiplicity a and has a value:

$$a=p_i-(d(x)-k_j)$$

Then, if a=d(x) then V' is set to V\{x}, (i.e., x is no longer a node of the reduced directed graph if the multiplicity of the new edge is equal to the indegree/outdegree of the node). If not, the nodes remain unmodified (V'=V), i.e., the reduced directed graph has the same nodes, but the edges between them are different).

Reduction rule 2 can be applied on any node. FIG. 7 illustrates this rule, as described above. Assume that the incoming nodes have multiplicities of 3, 2, and 1, respectively, and that outgoing edges have multiplicities of 1, 1, and 4, respectively. Then applying rule 2b) for edges 132 and 134, 4>(6−3), so the rule is satisfied, and a=3−(6−4)=1. A new edge 146 is therefore created in the reduced directed graph with a multiplicity of 1. In this example, edges 132 and 134 remain, with reduced multiplicities of 3−1=2 and 4−1=3, respectively. Edge 146 is labeled with the union of the labels of edges 132 and 134, as discussed above. The method can be repeated on the node 130 until no further reduction steps are possible (in the example case, no further reduction steps can be performed at this time).

A simplified case of Reduction Rule 2 can be seen in FIG. 3 where the node representing is has one incoming edge with a label rose is and one outgoing edge with a label is a. It is clear that in every possible cycle the same outgoing edge follows the incoming edge (since there are no other possible paths from the node in this case), and thus the labels can be combined to produce a new edge labeled rose is a with a multiplicity of 2. In this example, the node is is then eliminated, reducing the number of nodes in the reduced directed graph.

The Reduction Rule 2 may then be applied to other nodes in the reduced directed graph.

In some cases, Rule 2 is applied as a sequence of sub-rules, where the easiest cases are first identified, such as those nodes which have only one incoming edge and one outgoing edge, which therefore are automatically merged, before examining the more complex cases where there are two or more incoming/outgoing edges of a node and therefore the indegree of the node and multiplicities of the edges are taken into account.

In some embodiments, the order in which the rules are applied may influence the reduced directed graph which is generated. Accordingly, the method may be repeated one or more times, changing the order in which the steps are applied, or the nodes to which they are applied, to determine whether there are different reduced directed graphs which may be produced. The generation of the output sequences may use one or more of these reduced directed graphs.

Without intending to limit the scope of the exemplary embodiment, the following examples demonstrate the applicability of the method.

EXAMPLES

Experiments were performed on English out-of-copyright books (430 books) from the Gutenberg Project.

For these experiments, we selected books authored by H.G. Wells which were available in the Gutenberg Project, a collection English out-of-copyright books (www.gutenberg.org/).

There were 26 such books, for a total of 1.87 million words. All documents were tokenized using white spaces as segmentation points and n-grams (n=5) were extracted considering words as atomic symbols.

20 random walks were performed on the original de Bruijn graph and on a reduced directed graph generated as described above, starting from the same node. At each iteration, the next path was sampled based on the probabilities of the edges. The random walk was stopped as soon as the concatenated text reached 100 words. After anonymizing the original text, they were compared pairwise. In 11 cases (55%), the text coming from the reduced directed graph was considered more coherent; versus 5 cases for the texts coming from the unreduced directed graph (in the remaining 4 cases there was a tie). This indicates that using the reduced directed graph is more likely to generate plausible, and hence useful, text than the unreduced graph.

Also, an interactive version was implemented, where the system prompts the user with a sorted list of possible continuations, allowing the users to create their own story. The ease of use was greatly improved when the underlying data structure was the reduced directed graph rather than the input directed graph.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating an output sequence comprising:
providing a reduced directed graph derived from n-gram statistics for a corpus sequence of symbols, the reduced directed graph including a set of nodes connected by edges, each of the edges being labeled with a respective label consisting of a respective sequence of symbols, each of the edges being associated with a multiplicity representing a number of occurrences of the respective sequence of symbols in the corpus sequence, and wherein the sequences of symbols labeling the edges in the reduced directed graph vary in number of symbols, whereby at least one Eulerian cycle through the reduced directed graph traverses each edge a number of times corresponding to the multiplicity of the edge;
receiving an input sequence of symbols;
with a processor, for a first iteration, generating a first output sequence as a candidate for appending to the input sequence, comprising:
identifying a set of the labels of the edges in the reduced directed graph, the identified set of labels each including a prefix and a suffix, the prefix including at least a last symbol of the input sequence, the suffix comprising at least one subsequent symbol to the prefix in the label;
sampling a label from the identified set of labels with a probability which is a function of the multiplicity of the edges that are labeled with the labels in the set of labels, and
generating the first output sequence from the suffix of the sampled label;
outputting, to a graphical user interface, a candidate sequence for appending to the input sequence, comprising outputting at least one of:
the first output sequence from the first iteration; and
an extended output sequence, the extended output sequence including the first output sequence from the first iteration and a respective subsequent output sequence from each of at least one subsequent iteration appended thereto, wherein in each of the at least one subsequent iteration, the subsequent output sequence is generated from the reduced directed graph as a candidate for appending to an extended input sequence, the extended input sequence for the subsequent iteration being a document sequence generated by appending the first output sequence and each subsequent output sequence of each prior subsequent iteration to the received input sequence.

2. The method of claim 1, wherein each symbol is a word and each n-gram is a sequence of n symbols, where n is at least two.

3. The method of claim 1, wherein the method includes the first iteration and at least one subsequent iterations and wherein the extended output sequence includes the first output sequence from the first iteration and the subsequent output sequence from each of the at least one subsequent iteration.

4. The method of claim 1, wherein the method further comprises generating the reduced directed graph from an input directed graph by application of at least one reduction rule to the input directed graph, the input directed graph being generated from the n-gram statistics.

5. The method of claim 4, wherein the input directed graph includes a set of nodes connected by edges, each of the edges being labeled with a sequence of symbols and an associated multiplicity representing a number of occurrences of the sequence of symbols in the corpus sequence, each path through the input directed graph in which each edge is traversed the respective multiplicity of times reconstructing the corpus sequence from the labels in the order in which the edges are traversed.

6. The method of claim 5, wherein in the input directed graph, each label consists of an n-gram, each of the n-grams of the labels having a same number of symbols.

7. The method of claim 4, wherein the reduced directed graph is generated from the input directed graph by iteratively applying at least one reduction rule to generate a reduced directed graph, the at least one reduction rule comprising a reduction rule selected from:

a first reduction rule configured for identifying a division point node of the input directed graph, or of a reduced directed graph generated therefrom, which divides the respective graph into at least two connected components and wherein there is a unique incoming edge to the division point node in the first connected component and a unique outgoing edge from the division point node in the second connected component, the first reduction rule configured for generating a new edge with a label which is derived from the labels of the unique incoming edge and the unique outgoing edge; and a second reduction rule configured for identifying a node of the input directed graph or of a reduced directed graph generated therefrom which includes a first incoming edge and a first outgoing edge for which the multiplicity of one of the first incoming edge and the first outgoing edge is greater than a degree of the node minus the multiplicity of the other of the first incoming edge and the first outgoing edge, where the degree of the node is a sum of incoming edges of the node multiplied by their multiplicities, the second reduction rule configured for merging the first incoming edge and the first outgoing edge to create a new edge with a label which is derived from the first incoming edge and the first outgoing edge.

8. The method of claim 7, wherein the at least one reduction rule comprises the first reduction rule and the second reduction rule.

9. The method of claim 1, wherein the generating of the extended output sequence comprises, for the at least one subsequent iteration:

identifying a set of the labels for the edges in the reduced directed graph, which each include, as a prefix, at least the last symbol of the document sequence generated in the prior iteration, and as a suffix, at least one subsequent symbol;

sampling a label from the set, and generating the subsequent output sequence from the suffix of the label.

10. The method of claim 1, wherein n is at least 3.

11. The method of claim 1, further comprising generating the input directed graph from the n-gram statistics.

12. The method of claim 11, wherein the input directed graph comprises a de Bruijn graph.

13. The method of claim 12, wherein the corpus sequence is derived from at least one document authored by the user.

14. The method of claim 1, wherein the outputting includes proposing, on the graphical user interface, at least one of the first output sequence from the first iteration and the extended output sequence from at least one of the at least one subsequent iterations to a user for appending to the input sequence.

15. The method of claim 1, wherein the outputting comprises outputting a plurality of candidate extended output sequences for appending to the input sequence, each of the candidate extended output sequences comprising a different sequence of symbols.

16. A computer program product comprising a non-transitory recording medium storing instructions, which when executed on a computer, causes the computer to perform the method of claim 1.

17. A method for generating a text generation system comprising:

receiving n-gram statistics for a set of n-grams, generated for a corpus of documents or receiving the set of n-grams and generating the n-gram statistics therefrom;

generating an input directed graph based on the n-gram statistics, edges of the input directed graph being joined through nodes of the graph, each edge having an associated label corresponding to a sequence of symbols in the corpus and a multiplicity, representing a number of occurrences of the sequence of symbols in the corpus, of at least one, each of the n-grams in the set being represented by a respective one of the labels, whereby a Eulerian cycle through the graph traverses each edge a number of times corresponding to the multiplicity of the edge;

iteratively applying at least one reduction rule to generate a reduced directed graph, edges of the reduced directed graph being joined through nodes of the reduced directed graph, each edge having an associated label consisting of a sequence of symbols and a multiplicity of at least one, one path through the reduced directed graph in which each edge is traversed the respective multiplicity of times reconstructing the corpus sequence from the labels in the order in which the edges are traversed, and wherein the sequences of symbols in the reduced directed graph vary in number of symbols;

providing a text generation component which receives an input sequence of symbols and, in a first iteration, generates a first output sequence as a candidate for appending to the input sequence of symbols, the first output sequence being generated from a selected label of the reduced directed graph, the label being selected by sampling a label from an identified set of labels with a probability which is a function of the multiplicity of the edges that are labeled with the labels in the set of labels, the selected label including a prefix and a suffix, the prefix of the selected label matching at least a last symbol of the input sequence of symbols, the suffix of the selected label following the prefix, the suffix including at least one symbol; and providing a graphical user interface for displaying, to a user, at least one of: the first output sequence, an extended output sequence generated by the text generation in a subsequent iteration, and a document generated from the first output sequence or extended output sequence, the extended output sequence including the first output sequence and at least one subsequent output sequence generated from a further selected label of the reduced directed graph;

wherein at least one of the iteratively applying of the at least one reduction rule and the providing of the text generation component is performed with a processor.

18. The method of claim 17, wherein the generating of the first output sequence comprises, for the first iteration:

identifying a set of the labels for the edges in the reduced directed graph, which each include, as a prefix, at least the last symbol of the input sequence, and as a suffix, at least one subsequent symbol;

sampling a label from the set, and generating the first output sequence from the suffix of the label.

19. The method of claim 18, wherein each label in the set is sampled with a probability which is a function of the multiplicity of the respective edge.

20. A system for generating an output sequence comprising:

memory which stores a reduced directed graph generated from n-gram statistics for a corpus sequence of symbols generated for a corpus of text documents, the symbols comprising words, the reduced directed graph including a set of nodes connected by edges, each of the edges being labeled with a sequence of symbols and being associated with a multiplicity representing a number of occurrences of the sequence of symbols in the corpus sequence, and wherein the sequences of symbols labeling the edges in the reduced directed graph vary in number of symbols;

a text generation component which:
  a) receives an input sequence of symbols from a user, the symbols in the input sequence comprising words,
  b) in a first iteration of a number of iterations, generates a first output sequence as a candidate for appending to the input sequence of symbols, the first output sequence being generated from a label of the reduced directed graph, which label includes a prefix and a suffix, the prefix matching at least a last symbol of the input sequence of symbols, the suffix following the prefix, the suffix including at least one symbol, and
  c) in a subsequent iteration of the number of iterations, generates an extended output sequence as a candidate for appending to the input sequence of symbols, the extended output sequence including the first output sequence from the first iteration and a subsequent output sequence from each subsequent iteration, each subsequent output sequence being generated from a label of the reduced directed graph which includes a prefix and a suffix, the prefix matching at least a last symbol of the extended input sequence of symbols, the suffix following the prefix, the suffix including at least one symbol, the extended input sequence of symbols being a document sequence generated by appending the first output sequence and each subsequent output sequence of each prior subsequent iteration in the number of iterations to the received input sequence;

an output component which outputs the extended output sequence of symbols for the subsequent iteration, or a text document generated therefrom, to an associated client device; and a processor which implements the text generation component and the output component.

* * * * *